United States Patent [19]

Suzuki et al.

[11] Patent Number: 5,166,718
[45] Date of Patent: Nov. 24, 1992

[54] FINDER OPTICAL SYSTEM

[75] Inventors: Masaharu Suzuki; Makoto Sekita; Kazuo Fujibayashi, all of Kanagawa, Japan

[73] Assignee: Canon Kabushiki Kaisha, Tokyo, Japan

[21] Appl. No.: 698,342

[22] Filed: May 7, 1991

Related U.S. Application Data

[63] Continuation of Ser. No. 262,353, Oct. 25, 1988, abandoned.

[30] Foreign Application Priority Data

Oct. 30, 1987 [JP] Japan .................................. 2-276719
Nov. 12, 1987 [JP] Japan .................................. 62-287171

[51] Int. Cl.$^5$ ............................................. G03B 13/02
[52] U.S. Cl. .................................... 354/402; 354/225; 358/225
[58] Field of Search ............... 354/402, 403, 405, 225, 354/224, 219, 155, 201, 200, 199, 478; 358/225

[56] References Cited

U.S. PATENT DOCUMENTS

| | | | |
|---|---|---|---|
| 3,972,056 | 7/1976 | Tsujimoto et al. | 354/402 |
| 4,592,636 | 6/1986 | Kato et al. | 354/155 |
| 4,673,262 | 6/1987 | Tsuji | 354/225 |

Primary Examiner—Richard A. Wintercorn
Assistant Examiner—Cassandra Spyrou
Attorney, Agent, or Firm—Fitzpatrick, Cella, Harper & Scinto

[57] ABSTRACT

A finder optical system suited to the electronic camera of the single lens reflex type, the camera having the movable mirror for making a finder optical axis (second optical axis) from the optical axis (first optical axis) of the photographic light beam, including at least one reflecting member for reflecting this second optical axis in a direction perpendicular to the first optical axis and the second optical axis bent by the movable mirror and a secondary image forming lens, whereby the height of the finder is lowered, and further, while improving the finder magnification, an erect non-reverse image can be observed, is disclosed. Disclosure is made also on the arrangement of the light measuring element and the automatic focus adjusting device suited to the electronic camera.

20 Claims, 8 Drawing Sheets

FINDER OPTICAL SYSTEM

This application is a continuation of application Ser. No. 262,353 filed Oct. 25, 1991.

BACKGROUND OF THE INVENTION

1. Field of the Invention

This invention relates to a finder optical system suited to the single lens reflex type electronic camera of performing still image treatment electrically by using an image pickup element such as CCD.

2. Description of the Related Art

Figure 6:
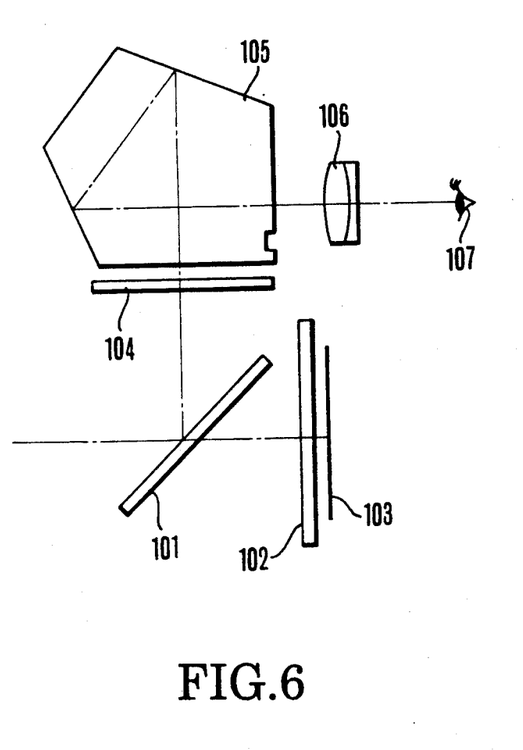
FIG. 6 is a sectional view of the finder optical system of the conventional single lens reflex camera.

In the past, the single lens reflex camera using the pentagonal roof prism for silver halide film of 35 mm size has greatly developed as is optimum on making the system to expand. The construction of its typical finder optical system is schematically shown in FIG. 6. In FIG. 6, 101 is a total-reflection mirror; 102 is a shutter unit; 103 is a film plane; 104 is a focusing screen; 105 is a pentagonal roof prism: 106 is an eyepiece lens; and 107 is a pupil for observation. The finder optical system shown in FIG. 6 has excellent optical performances that the ratio of the object image observed by the finder optical system to the image area photographed on the film plane, i.e., the viewfield rate, is more than 90% and the viewfield magnification γ is more than 0.8× when the standard lens is in use. And, this finder optical system has a feature that the whole apparatus can be constructed with a relatively small size.

However, when the above-described pentagonal roof prism is used in a finder optical system for the electronic camera using a plurality of image pickup elements such as the so-called CCDs, namely, of the 2-plate type, or of the 3-plate type, it becomes difficult to obtain as high a viewfield rate and as high a viewfield magnification as in the conventional single lens reflex camera. This owes to the following reasons:

(i) Since the effective image area of, for example, the ⅔ in. image pickup element is small as compared with the 35 mm film, being ¼ in diagonal length ratio, if the conventional pentagonal roof prism is employed, the optical length is too long to obtain a high viewfield rate and a high viewfield magnification without difficulty.

(ii) Since a large space is needed for arranging the electrical processing circuits in the rear of the image pickup element, the distance from the image plane of the photographic lens to the rearmost end of the camera becomes long. For this reason, the construction must be made such that the pupil position of the finder optical system is extended to the camera side rear. This results in the difficulty of obtaining the high viewfield rate and the high viewfield magnification.

(iii) Since in front of the image pickup element, many spaces are needed for arranging the separation prism for splitting light to a plurality of light beams, the low pass filter, the infrared cut filter, the protection glass, etc. a large distance between the split point of the finder optical path and the image pickup plane must be taken, causing the whole apparatus to become large.

Figure 7:
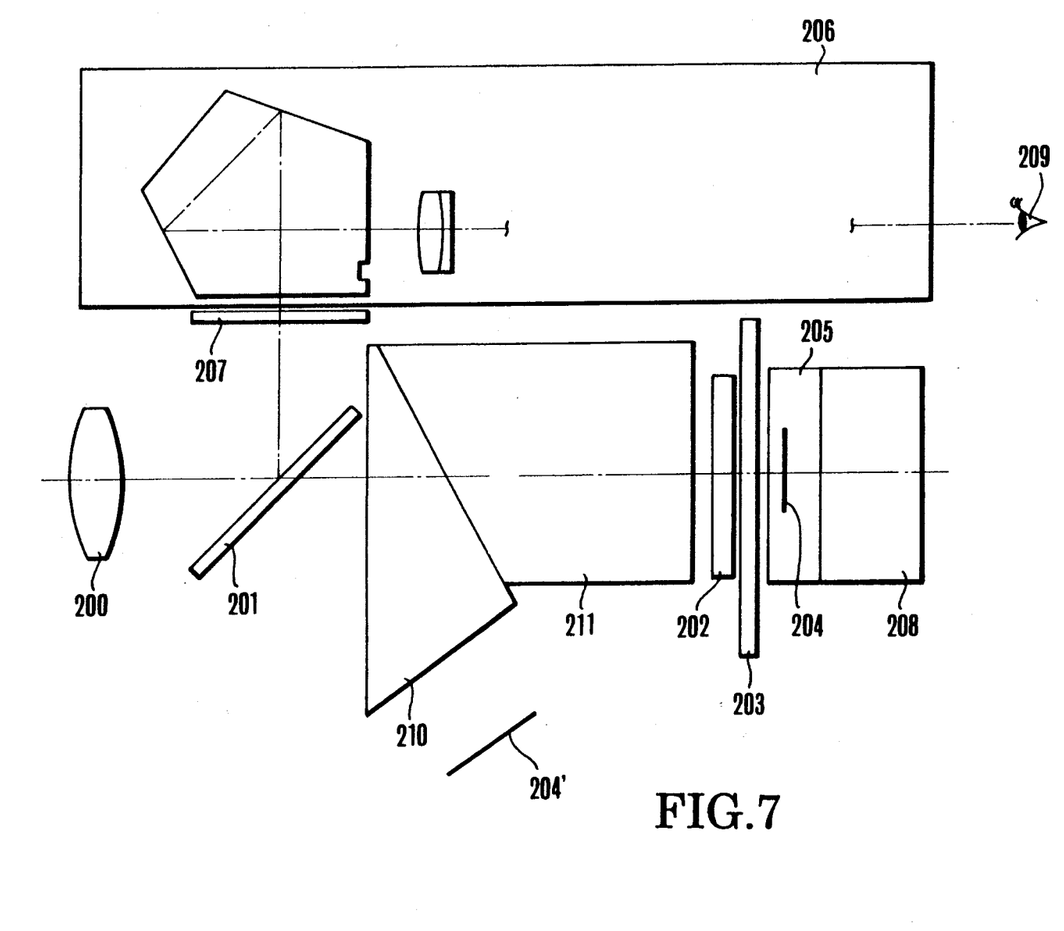
FIG. 7 is a schematic view of a finder optical system for the 2-plate type electronic camera assumed to use the pentagonal roof prism.

Next, for reference, one example of a finder optical system of the case of aiming that a higher viewfield rate than 90% is achieved by using the conventional pentagonal roof prism in the electronic camera is shown in FIG. 7. In FIG. 7, 200 is a photographic lens; 201 is a splitting unit for splitting the optical path from the photographic optical path to the finder optical system; 202 is a low pass filter; 203 is a shutter unit; 204 is an image pickup plane of an image pickup element; 205 is a package of the image pickup element with a protection glass having the infrared cut effect arranged in front thereof; 206 is a finder optical system unit including an erecting non-reverse image system; 207 is a focusing screen; 208 is an electrical processing circuit unit for image pickup signals; 209 is a pupil for observation. Also, 204' is another image pickup plane. 210 and 211 are separation prisms for image separation of a photographic light beam.

In general, the greater the viewfield magnification γ, the easier the finder image becomes to observe. The viewfield magnification γ is expressed by $\gamma = f\theta/fe$ where $f\theta$ is the standard focal length of the photographic lens and $fe$ is the focal length of the eyepiece lens. To increase the viewfield magnification γ, because the focal length $f\theta$ of the photographic lens is almost constant, the focal length $fe$ of the eyepiece lens must be decreased. Since the eyepiece lens is so arranged that its front focal point lies at or near the finder image plane of the finder optical system, for an increase of the viewfield magnification γ, the optical path of an optical system for obtaining an erect non-reverse image from the focusing screen to the eyepiece lens must be made as short as possible.

On the contradictory, in the case of the electronic camera, as has been described before, on the front and rear sides of the image pickup plane of the photographic system there must be arranged the infrared cut filter and the low pass filter and further the electrical processing circuit for electrically processing the image information and other units. For this reason, there is need to shift the movable mirror (quick return mirror) for conducting the light beam from the object to the finder optical system toward the object side (front), and also the observing position toward the rear.

Therefore, in the case of the arrangement that the image for the finder of the photographic lens on the focusing screen is directly observed through the eyepiece lens, it is unavoidable to increase the focal length of the eyepiece lens with the result that the viewfinder magnification becomes small. Hence, the finder becomes harder to observe. And, while attempts have been made to reduce the focal length of the eyepiece lens as proposed in, for example, Japanese Laid-Open Patent Application No. Sho 60-43628, the finder magnification has nevertheless been limited to about 0.5×.

Meanwhile, the latitude of the electronic camera using the solid state image pickup element such as CCD is narrow compared with the camera using silver halide film, being about ⅓–⅔ times that of the silver halide film.

Therefore, the accuracy of light measurement must be higher than that for the still camera using silver halide film. And, as the general arrangement of the light measuring element in the camera using silver halide film there are known the side portion of the eyepiece lens and the bottom plate of the camera body. In any case, however, by the influence of the squint, etc., it was difficult to carry out light measurement without the squint accurately.

Further, again in the case of the electronic camera using supplemental optical members such as the beam splitting prism for splitting the light beam, the low pass filter and the infrared cut filter, the image quality of the image pickup element formed with the light passing this prism and the image quality formed with the light not passing the prism come to differ from each other by an amount corresponding to the optical path of the prism.

In a case where the focus detecting device is merely put in the position to which the split light beam in passing through the quick return mirror is directed by using a sub-mirror provided thereon and before which there are no supplemental optical members, because the image qualities of the image pickup element and the focus detecting device come to differ, the accuracy of distance measurement is difficult to improve. Particularly in the electronic camera whose image plane size is smaller than that for the silver halide film, the degree of allowance of the field depth becomes smaller. Hence, a higher accuracy of distance measurement is required.

SUMMARY OF THE INVENTION

A first object of the present invention is to provide a finder optical system suited to the electronic camera of the single lens reflex type.

A second object is to improve the finder magnification of the aforesaid camera.

A third object is to provide a finder optical device of compact form while still easing observation by bending the finder optical path properly and particularly by lowering the height of the finder.

A fourth object is to provide a device which enables achievement of squint-free, accurate light measurement.

A fifth object is to provide an electronic camera capable of accurate distance measurement.

Other objects will become apparent from the drawings and the detailed description below.

DETAILED DESCRIPTION OF THE PREFERRED EMBODIMENTS

Embodiments of the present invention are described below with reference to the drawings.

Figure 1:
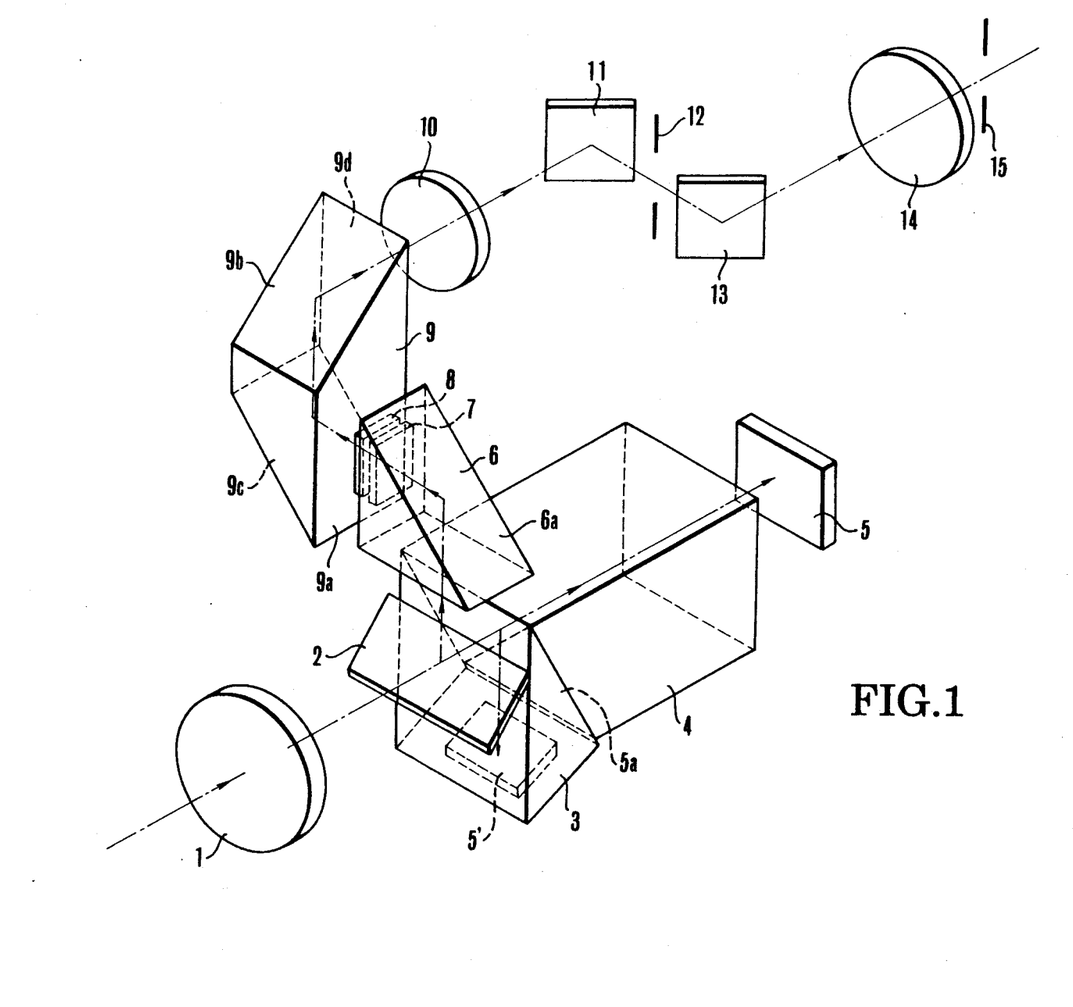
FIG. 1 is a perspective view of a finder optical system illustrating an embodiment of the invention.

FIG. 1 is an embodiment of the invention applied to a finder optical system for the 2-plate type electronic camera. 1 is a photographic lens having a first optical axis to determine a photographic light beam; 2 is a movable mirror arranged to retract to the outside of the photographic light beam when an exposure is made and to bend the first optical axis 90° upward to make a second optical axis to determine a finder light beam when the finder is observed. 3 is a front side prism of a 2-beam splitting prism and 4 is a rear side prism of a 2-beam splitting prism, these being provided to split the light beam at a half-mirror surface 5a and conduct the split light beams to respective image pickup element units 5' and 5 each comprising a CCD. The light beam from the object passed through the photographic lens 1, when the finder is observed, is reflected by the movable mirror 2 at almost right angles in an upward direction to the optical axis of the photographic lens 1, and enters into and then exits from a glass block 6a having an almost equal optical path length to the optical path length of the prism and filter members (not shown) in the photographic optical path and having a reflection surface 6a. The glass block 6 is in the form of a right-angled prism with its reflection surface 6a bending the light beam from the movable mirror 2 so that the optical axis of the reflected light beam makes right angles even with a virtual plane including the optical axis of the photographic lens 1 and the optical axis of the light beam from the movable mirror 2. And, the finder light beam focuses an image on a focusing screen in an optically equivalent position to the image pickup plane of the image pickup element unit 5.

This finder image formed on the focusing screen 7 further passes through a field lens 8, is twice reflected by a prism 9 in the form of two right-angled prism elements cemented together, and is conducted toward an eyepiece lens 14. At first, by a reflection surface 9c of the prism 9, the optical axis of the finder is reflected so as to be almost parallel to, and to orient in the same direction as, the reflected optical axis by the movable mirror 2, then by another reflection surface 9b, the optical axis of the reflected light beam is reflected so as to be almost parallel to, and to orient in the same direction as, the optical axis of the photographic lens 1. And further, it passes through a secondary image forming lens 10, and is reflected by a mirror 11 so that the optical axis of the reflected light beam becomes almost parallel to, and is oriented in the reverse direction to, the optical axis of the reflected light beam by the reflection surface 6a. Then, by a mirror 13, the optical axis of the reflected light beam is reflected so as to become almost parallel to, and to be oriented in the same direction as, the direction of the optical axis of the photographic lens 1. 12 is a secondary image plane position in which the primary image plane on the focusing screen 7 is focused to an enlarged image by the secondary image forming lens 10, the latter of which is observed by the eyepiece lens 14. 15 represents an eye point.

In the finder of the primary image formation type in which the image on the focusing screen is observed directly by the eyepiece lens, there is need to arrange the roof surfaces so that the left-to-right direction is converted to a non-reverse image. On the other hand, the present invention obtains the erect non-reverse image with the use of six reflection members in total and one secondary image forming lens. Also, in the secondary image formation type that after the primary image plane on the focusing screen has been re-focused at the secondary image plane 12 by the secondary image forming lens 10, the latter is observed by the eyepiece lens 14, the left-to-right direction returns to the original one by the reversions resulting from the two times of image formation. Therefore, there is no need for using any expensive optical system such as the roof surfaces and the pentagonal prism. Thus, the optical system is simplified.

Figure 2A:
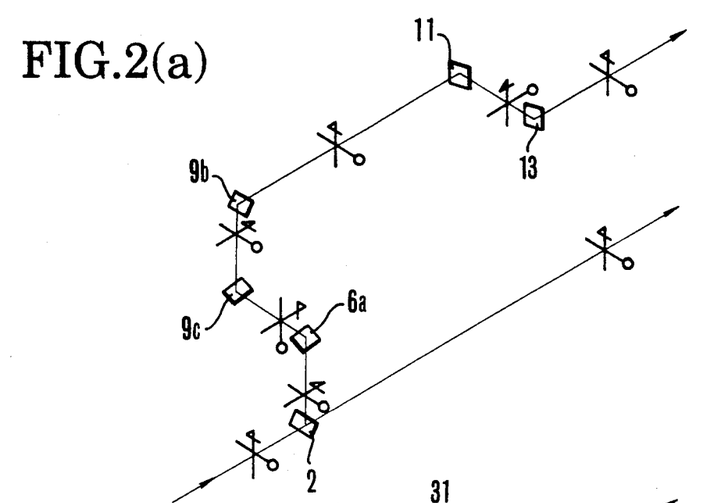
FIGS. 2(a) and 2(b) are views illustrating the vertical and lateral relations of the image in the finder optical system.

In the present invention, two reflection surfaces, namely, the reflection surface 6a and the reflection surface 9c, are introduced into the space between the movable mirror 2 and the reflection surface 9b as in FIG. 2(a). So there is no inversion of the image. And, the mirrors 11 and 13 are provided in order to earn an optical path for the purpose of doing observation at a proper position. With these, the vertical and horizontal directions of the reflected light beam can be observed in the same orientation. Therefore, the image which is right in both of the vertical and horizontal directions can be observed in the proper position by the eyepiece lens 14.

Figure 2B:
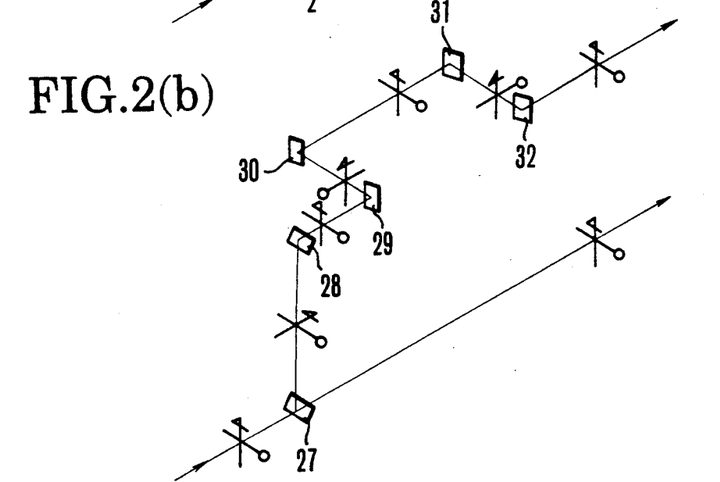

Next, another embodiment is shown by only the reflection members and the finder optical axis. The embodiment shown in FIG. 2(b) also is constructed of a movable mirror 27, to reflection members 28, 29, 30, 31 and 32, and has the eyepiece lens in the same position as in FIG. 2(a).

As has been described above, by 3-dimensionally conducting the finder optical axis, it is made possible to lower the height of the finder and to provide a compact finder device.

Figure 3:
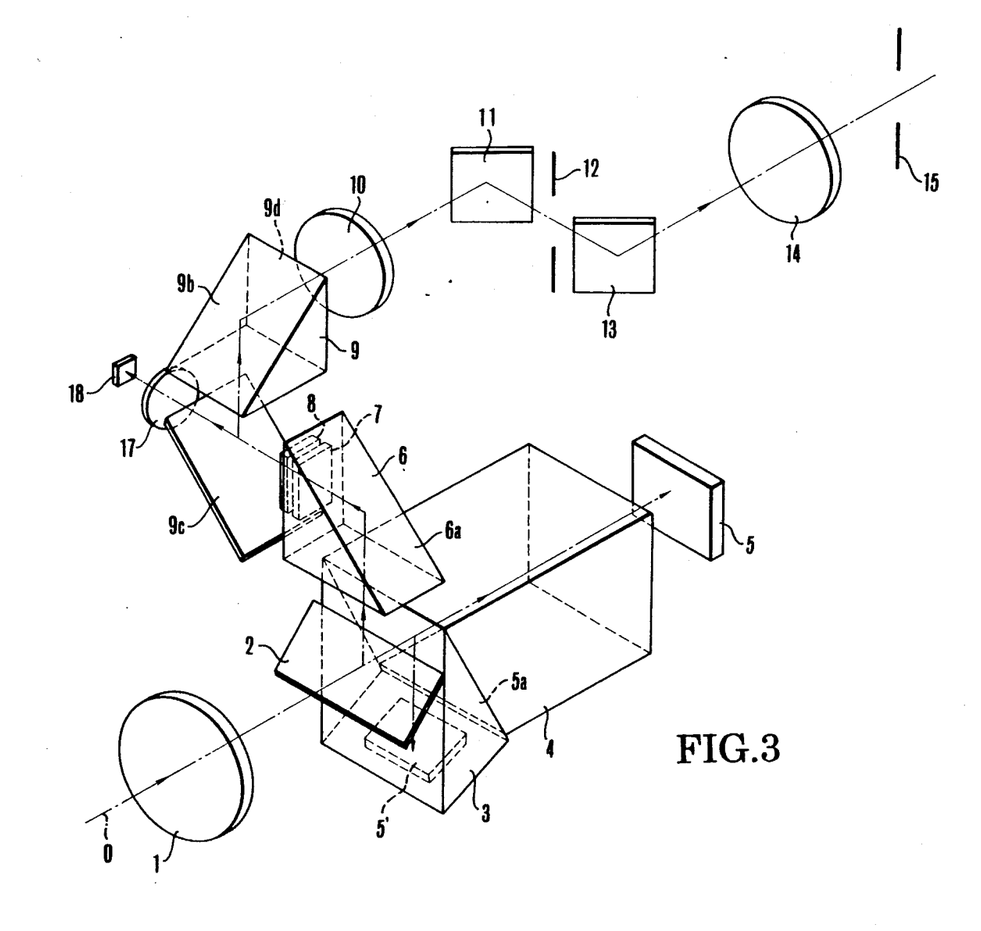
FIG. 3 is a view illustrating an embodiment concerning with the arrangement feature of a light measuring element of the invention.

Next, an embodiment which represents a desirable arrangement of a light measuring element for the electronic camera using the above-described finder optical system is described on the basis of FIG. 3.

It should be noted that the fundamental feature concerning the optical path of the finder is, in principle, coincident with that of FIG. 1. So its explanation is omitted here. Also, with respect to the members that perform the same functions, the same reference numerals are attached.

Points of difference from the feature shown in FIG. 1 are that the reflection surface 9c of FIG. 1 is made to be a half-permeating surface and that, in a direction in which the permeated light beam advances, an image forming lens unit 17 for light measurement and a light measuring element 18 are arranged with the latter at the image plane position of the image forming lens unit 17. It should be noted that the optical axis of the light measuring system coincides with the reflected optical axis by the reflection surface 6a.

The light measuring element 18 of this embodiment is enabled by forming a plurality of plane-divided light measuring areas to perform not only average light measuring, of course, but also partial light measuring.

Since the light measuring element in the above-described embodiment is arranged on the bent optical axis by the reflection surface 6a, it is possible that while improving the finder magnification and assembling the parts in compact form, parallax-free, accurate light measurement is carried out. It should be noted that the light measuring system of the invention performs the evaluative light measuring by the image forming lens unit 17 and the light measuring element 18 comprised of the divided-to-plurality light receiving portion. Also, since the image forming lens unit 17 for light measurement can be put in a relatively near position to the focusing screen 7 and the field lens 8, it is made possible to reduce the diameter of the lens with a small F-number, in other words, design a faster lens for light measurement.

Figure 4A:
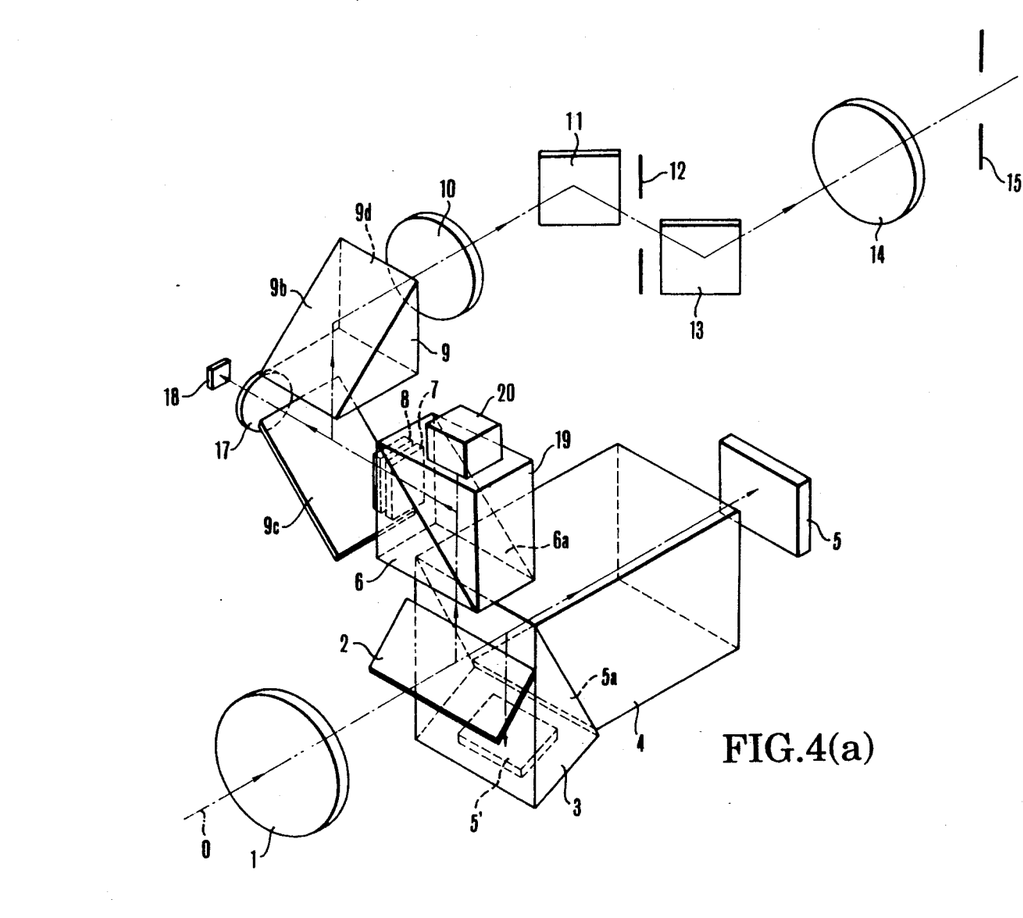
FIG. 4(a) is a view illustrating an embodiment concerning with the arrangement of a light measuring element and a distance measuring element of the invention.

Next, a desirable feature of arrangement of an automatic focus detecting device for the electronic camera in connection with the finder optical system of the invention is described on the basis of FIG. 4(a).

Since a fundamental finder optical path is similar to the embodiments shown in FIG. 1 and FIG. 3, its explanation is omitted. As for points of difference, another prism 19 is provided as opposed to the prism 6. And the reflection surface 6a of the prism 6 is made to be a half-permeating surface. The next point is that an automatic focus detecting device 20 is arranged in a position which lies beyond the prism 19 on the half-permeated finder optical axis and which is optically conjugate to the image pickup element units 5 and 5'.

By such an arrangement, the image quality passed through the prism 3 and the prism 4 and to be picked up becomes almost equal to the image quality passed through the prisms 6 and 19 and lying on the automatic focus detecting device 20. Thus, an accurate distance measurement can be achieved. It should be noted that the optical path length of the prism 3, the prism 4 and further the supplementary optical members including, though not shown, a low pass filter and an infrared cut filter is substantially equal to the reduced optical path length of the prism 6 and the prism 19.

20 is a focus detecting device positioned on the finder optical axis formed as reflected by the movable mirror 2 to detect the state of focus adjustment of the photographic lens 1. Concerning this detecting device 20, its construction is described based on FIG. 4(b).

Figure 4B:
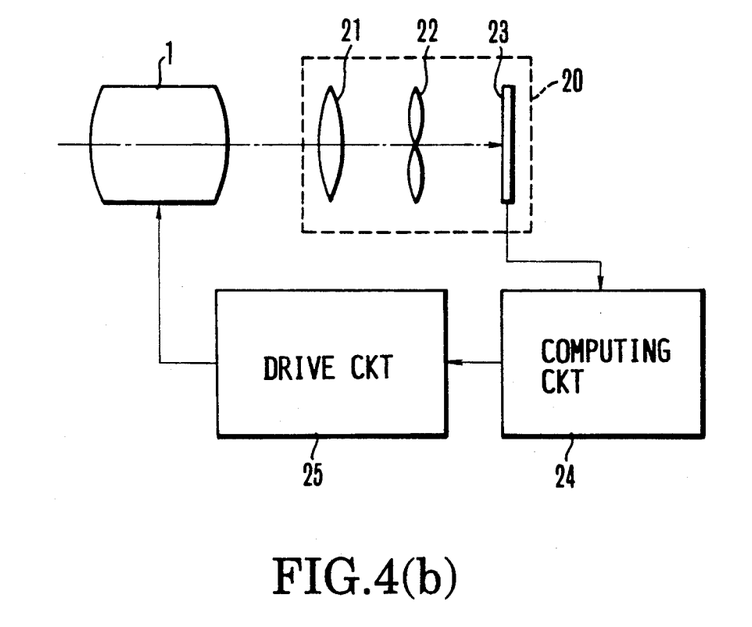
FIG. 4(b) is a schematic view illustrating the arrangement of the automatic focus detecting device shown in FIG. 4(a).

21 is a field lens; 22 is a secondary image forming system for diving the pupil of the photographic lens 1 to a plurality of parts, and for forming a plurality of images on a sensor 23. 24 is a computing circuit for deriving the correlation of the electrical outputs of all the plurality of images, in other words, the image deviation, to compute the defocus amount of the photographic lens 1; 25 is a drive circuit for moving a focusing lens (not shown) in the photographic lens 1 along an optical axis on the basis of the computation result of the computing circuit 24.

As has been described above, according to this embodiment, it is made possible that while lowering the height of the finder, the focus detecting device is arranged skillfully in the vacant space and, nevertheless, an accurate distance measurement is achieved.

Figure 5:
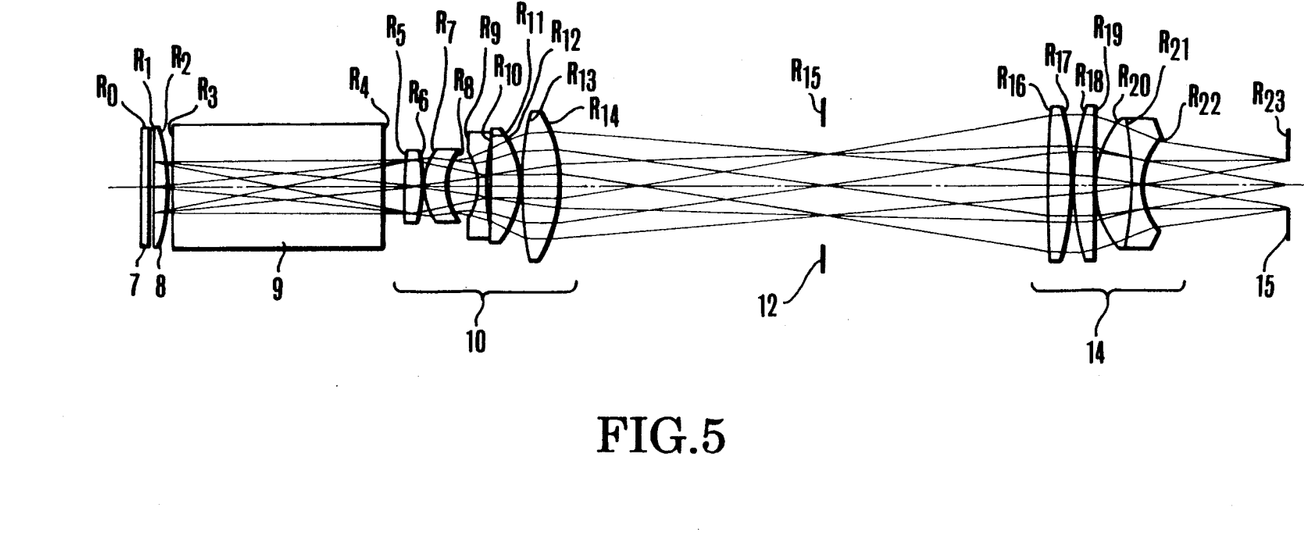
FIG. 5 is an expanded view of the finder optical system to the finder optical axis of the embodiment of the invention.

In the following, a numerical example of the finder optical system shown in FIG. 1 is shown on the basis of FIG. 5 in the expanded view along the finder optical axis. The reference numerals correspond to that used in FIG. 1.

Incidentally, Ri is the radius of curvature of the i-th lens surface counting from the direction in which the finder light beam advances, Di is the i-th lens thickness or air separation, Ni and $vi$ are respectively the refractive index and Abbe number of the glass of the i-th lens element.

|    | Ri       | Di    | ni      | vi   |     |
|----|----------|-------|---------|------|-----|
| 0  | ∞        | 0.5   | 1.      |      |     |
| 1  | ∞        | 2.00  | 1.516330| 64.1 | ⎫   |
| 2  | −20.0000 | 1.50  | 1.      |      | ⎬ 8 |
| 3  | ∞        | 28.00 | 1.516330| 64.1 | ⎭   |
| 4  | ∞        | 1.50  | 1.      |      |     |
| 5  | 37.4745  | 2.20  | 1.772500| 49.6 | ⎫   |
| 6  | −33.5810 | 0.15  | 1.      |      |     |
| 7  | 6.1750   | 2.50  | 1.696800| 55.5 |     |
| 8  | 5.0470   | 4.20  | 1.      |      |     |
| 9  | −5.6973  | 0.80  | 1.846660| 23.9 | ⎬ 10|
| 10 | 8697.7600| 0.60  | 1.      |      |     |
| 11 | −28.6573 | 3.90  | 1.622990| 58.2 |     |
| 12 | −8.2537  | 0.15  | 1.      |      |     |
| 13 | 51.1909  | 3.80  | 1.772500| 49.6 |     |
| 14 | −17.3200 | 39.33 | 1.      |      | ⎭   |
| 15 | ∞        | 26.44 | 1.      |      |     |
| 16 | 76.0780  | 3.40  | 1.696800| 55.5 |     |
| 17 | −36.4740 | 0.15  | 1.      |      |     |

-continued

| | Ri | Di | ni | vi | |
|---|---|---|---|---|---|
| 18 | 23.4640 | 3.20 | 1.603110 | 60.7 | |
| 19 | 163.0900 | 0.15 | 1. | | 14 |
| 20 | 13.3660 | 5.70 | 1.603110 | 60.7 | |
| 21 | −49.8520 | 1.00 | 1.728250 | 28.5 | |
| 22 | 9.3680 | 18.00 | 1. | | |
| 23 | ∞ | 0.0 | 1. | | |

Field Lens 8 f = 38.735
Secondary Image Forming Lens 10 f = 21.662
Eyepiece Lens 14 f = 20.520
Secondary Image Magnification 1.25X The coordinates of the cross point of the optical axis of the finder light beam with each surface

| | X | Y | Z |
|---|---|---|---|
| The Cross Point of the Optical Axis of the Photographic Lens 1 with the Movable Mirror 2 | 0 | 0 | 0 |
| Reflection Surface 6a | 0 | 0 | 30 |
| Primary Image Plane on Focusing Screen 7 | 0 | 13.5 | 30 |
| Reflection Surface 9c | 0 | 23.5 | 30 |
| Reflection Surface 9b | 0 | 23.5 | 44 |
| Reflection Surface of Mirror 11 | 55 | 23.5 | 44 |
| Secondary Image Plane 12 | 55 | 12 | 44 |
| Reflection Surface of Mirror 13 | 55 | 0 | 44 |
| Last Surface of Eyepiece Lens 14 | 82.9 | 0 | 44 |

The direction of the coordinates are defined as follows:

With the X axis in the optical axis of the photographic lens, the direction from the object to image plane is a plus direction;

The upward direction from the optical axis of the photographic lens is a plus direction of Z axis; and The direction to the left side at a right angle from the optical axis of the photographic lens is a plus direction of the Y axis.

What is claimed is:

1. A finder optical device for observing an image formed by a photographic lens having a first optical axis to determine a photographic light beam, comprising:
   a first reflecting member for forming a second optical axis from said first optical axis to determine a finder optical path;
   an eyepiece lens unit;
   five reflecting members provided to relay said second optical axis from said first reflecting member to said eyepiece lens unit; and
   a secondary image forming lens unit for refocusing the image located on the second optical axis between said first reflecting member and said eyepiece lens unit said secondary image forming unit being positioned between a third and fourth of said five reflecting members;
   wherein said five reflecting members and said first reflecting member are arranged so as to provide three pairs of parallel reflection surfaces.

2. A device according to claim 1, wherein the direction of a lens optical axis of said eyepiece lens unit coincides with the direction of said first optical axis.

3. A device according to claim 1, further comprising:
   an image pickup device positioned on said first optical axis at a prescribed image focusing plane.

4. A device according to claim 3, wherein said first reflecting member is a movable mirror which when photographing retracts from said first optical axis.

5. A device according to claim 1, wherein said five reflecting members comprise, in a direction in which the finder optical path advances, a second reflecting member for reflecting said second optical axis in a direction almost perpendicular to said first optical axis and said second optical axis, said third reflecting member for reflecting said second optical axis in the same direction as that of said second optical axis reflected by said first reflecting member, said fourth reflecting member for reflecting said second optical axis in the same direction as that of said first optical axis, a fifth reflecting member for reflecting said second optical axis in the same direction as that of said second optical axis reflected by said second reflecting member, and a sixth reflecting member for reflecting said second optical axis in a direction parallel to said first optical axis.

6. A device according to claim 5, further comprising a field lens unit positioned in a space between said second and said third reflecting members.

7. A device according to claim 5, wherein said secondary image forming lens unit is positioned in a space between said fourth and said fifth reflecting members.

8. A device according to claim 7, wherein an image formed by said secondary image forming lens unit takes a position in a space between said fifth and sixth reflecting members.

9. A device according to claim 1, wherein said five reflecting members comprise, in a direction in which the finder optical path advances, a second reflecting member for reflecting said second optical axis in the same direction as that of said first optical axis, said third reflecting member for reflecting said second optical axis in a direction perpendicular to said first and said second optical axes, said fourth reflecting member for reflecting said second optical axis in the same direction as said first optical axis, a fifth reflecting member for reflecting said second optical axis in a direction perpendicular to said first and said second optical axes, and a sixth reflecting member for reflecting said second optical axis in the same direction as said first optical axis.

10. A device according to claim 1, further comprising a light measuring unit positioned on said second optical axis.

11. A device according to claim 10, wherein said light measuring unit comprises a light measuring lens and a light measuring sensor, and is arranged so that an optical axis of said light measuring lens coincides with said second optical axis.

12. A device according to claim 1, further comprising an automatic focus detecting device positioned on said second optical axis.

13. A single lens reflex camera system comprising:
   a photographic lens unit having a first optical axis to determine a photographic light beam;
   image pickup means positioned on said first optical axis at a predetermined image focusing plane of said photographic lens unit to convert an image formed by said photographic lens unit into an electrical signal;
   a first reflecting member for forming a second optical axis from said first optical axis to determine a finder optical path;
   an eyepiece lens unit;
   a plurality of reflecting members provided to relay said second optical axis from said first reflecting member to said eyepiece lens unit wherein said first reflecting member and said plurality of reflecting members are arranged so as to provide three pairs of parallel reflection surfaces;

an image forming lens unit for re-focusing an image formed by said photographic lens unit, located on the second optical axis between said first reflecting member and said eyepiece lens unit said image forming unit being positioned between a third and a fourth of said plurality of reflecting members; and a photoelectrical converting unit positioned on a split part of said second optical axis.

14. A system according to claim 13, further comprising a lens unit positioned on said second optical axis to cause an image formed by said photographic lens to re-focus.

15. A system according to claim 13 or 14, wherein said photoelectrically converting unit is a focus detecting device for detecting the state of focus adjustment of said photographic lens unit.

16. A system according to claim 15, further comprising a prism unit positioned on said second optical axis in a space between said focus detecting device and said first reflecting member.

17. A system according to claim 13, wherein said photoelectrical converting unit is a light measuring unit.

18. A system according to claim 17, wherein said light measuring unit comprises an image forming lens and a light measuring sensor.

19. A system according to claim 13, wherein said reflecting member for splitting said second optical axis splits said second optical axis to two directions, one of which is almost perpendicular to said first optical axis and said second optical axis reflected by said first reflecting member and another of which is the same as said second optical axis.

20. A system according to claim 19, further comprising detecting means for detecting the state of focus adjustment positioned at a location split to the same direction as said second optical axis.

* * * * *

UNITED STATES PATENT AND TRADEMARK OFFICE
CERTIFICATE OF CORRECTION

PATENT NO. : 5,166,718

DATED : November 24, 1992

INVENTOR(S) : SUZUKI ET AL.

Page 1 of 2

It is certified that error appears in the above-identified patent and that said Letters Patent is hereby corrected as shown below:

TITLE PAGE:

<u>At [30] Foreign Application Priority Data</u>

"2-276719" should read --62-276719--.

<u>Column 1</u>

Line 5, "Oct. 25, 1991." should read --Oct. 25, 1988.--
Line 21, "prism:" should read --prism;--.

<u>Column 2</u>

Line 26, "contradictory," should read --contrary,--.

<u>Column 3</u>

Line 38, "with" should be deleted.
Line 41, "with" should be deleted.

<u>Column 5</u>

Line 15, "to" should read --and--.

<u>Column 6</u>

Line 25, "diving" should read --driving--.

<u>Column 7</u>

Line 14, "surface" should read --surface:--.
Line 52, "unit said" should read --unit, said--.

UNITED STATES PATENT AND TRADEMARK OFFICE
CERTIFICATE OF CORRECTION

PATENT NO. : 5,166,718
DATED : November 24, 1992
INVENTOR(S) : SUZUKI ET AL.

It is certified that error appears in the above-identified patent and that said Letters Patent is hereby corrected as shown below:

<u>Column 8</u>

Line 55, "predetermined" should read --prescribed--.

<u>Column 9</u>

Line 4, "unit said" should read --unit, said--.
Line 15, "photoelectrically" should read --photoelectrical--.

Signed and Sealed this

Fourteenth Day of December, 1993

Attest:

BRUCE LEHMAN

Attesting Officer    Commissioner of Patents and Trademarks